Jan. 7, 1964 F. W. TRIPLETT 3,116,585
BOOM AND TREE SHAKER ASSEMBLY
Original Filed Aug. 31, 1959 2 Sheets-Sheet 1
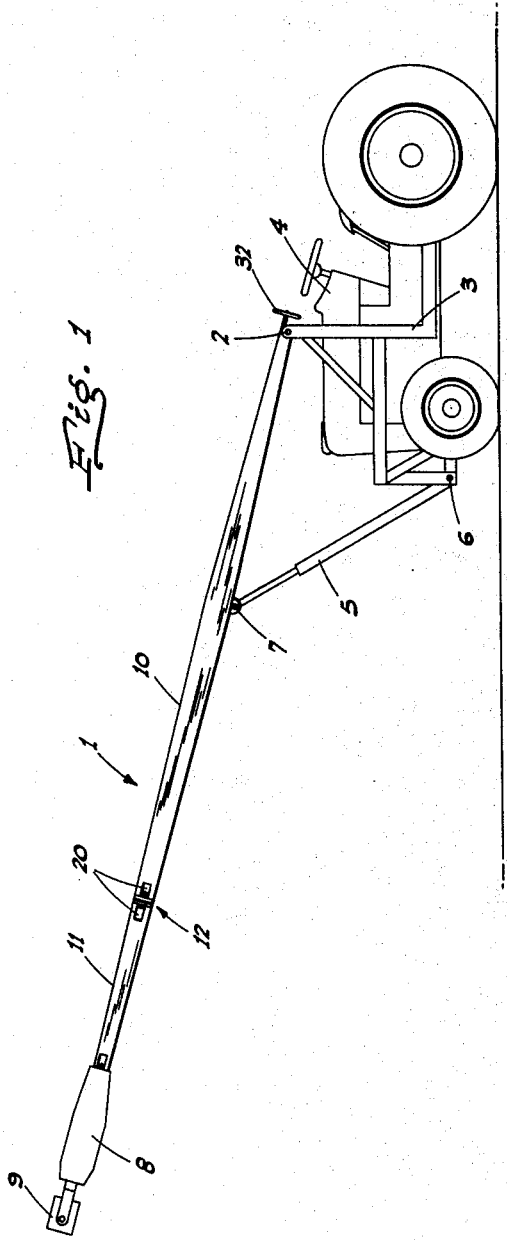
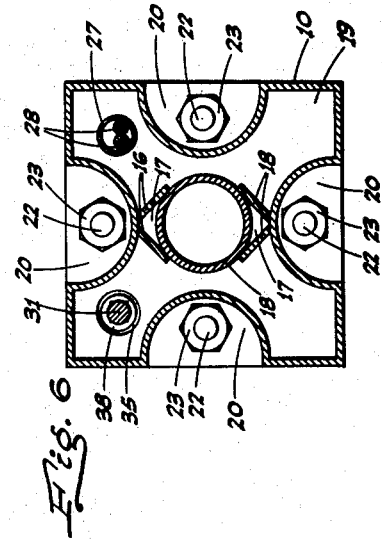
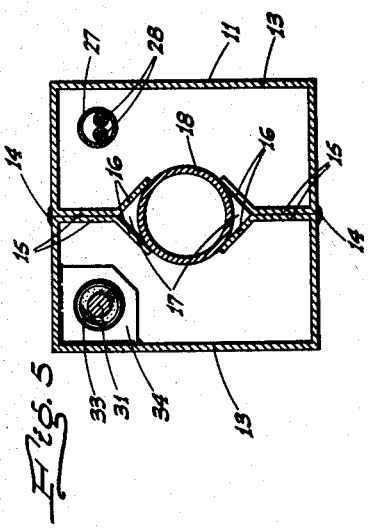
INVENTOR.
Frank W. Triplett
BY
Webster & Webster
ATTYS.

Jan. 7, 1964     F. W. TRIPLETT     3,116,585
BOOM AND TREE SHAKER ASSEMBLY
Original Filed Aug. 31, 1959     2 Sheets-Sheet 2
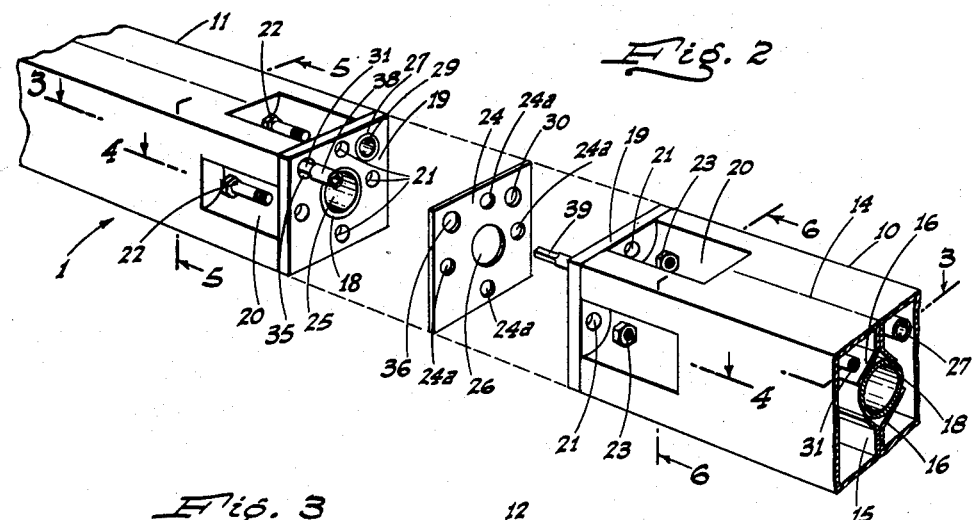
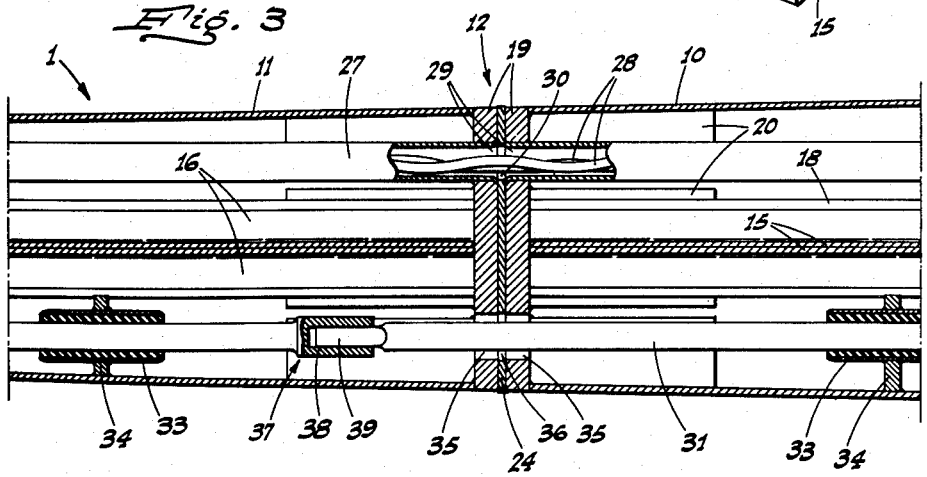
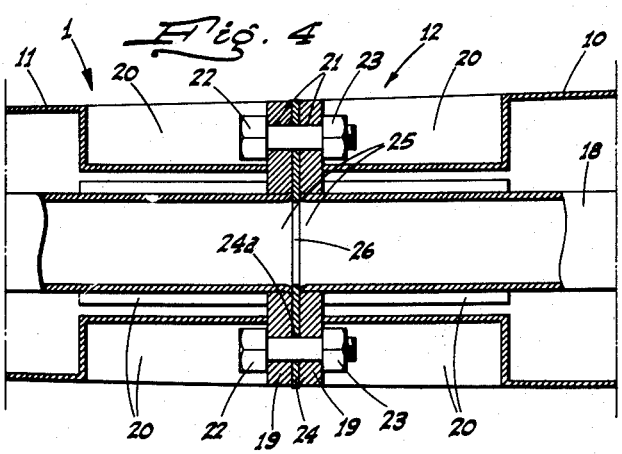
INVENTOR.
Frank W. Triplett
BY
Webster & Webster
ATTYS.

United States Patent Office 3,116,585
Patented Jan. 7, 1964

3,116,585
BOOM AND TREE SHAKER ASSEMBLY
Frank W. Triplett, Stockton, Calif., assignor to A. D. Goodwin & Son, Inc., a corporation of California
Original application Aug. 31, 1959, Ser. No. 837,074, now Patent No. 3,063,523, dated Nov. 13, 1962. Divided and this application Oct. 1, 1962, Ser. No. 227,423
3 Claims. (Cl. 56—328)

This application is a division of application Serial No. 837,074, (now Patent No. 3,063,523) filed August 31, 1959, for a Boom, and is directed specifically to a boom and shaker head assembly wherein a shaker head—which is turnably mounted at the outer end of an elongated sectional boom of the character shown in said application—may be effectively controlled from a point at the lower end of the boom and adjacent the operator's seat on the tractor or other vehicle on which the boom is mounted.

The primary object of the present invention is to provide such a control means as may be effectively connected with the turnable shaker head and supported by the boom sections in such a manner as to not interfere with the ready separation of the boom sections and their reassembly in a rapid and effective manner.

While the present application and the claims herein are directed specifically to the combination of the boom and shaker head assembly with the control means for the latter, it is deemed proper that a somewhat detailed description of the entire boom structure and the relationship thereto of the presently claimed invention should be set forth, as disclosed in the accompanying drawings in which:

FIG. 1 is a somewhat diagrammatic side elevation of the boom as included in a tractor mounted tree shaking mechanism.

FIG. 2 is a fragmentary perspective view, exploded, of a representative longitudinal portion of the boom; the view showing adjacent portions of the boom sections, and the parts which comprise the joint therebetween.

FIG. 3 is a fragmentary longitudinal sectional plan view corresponding to FIG. 1, but showing the adjacent portions of the boom as assembled; the view being taken on line 3—3 of FIG. 2 and specifically disclosing the separable connection for the shaker head control shaft.

FIG. 4 is a similar view, but is taken on line 4—4 of FIGURE 2.

FIG. 5 is a transverse section taken on line 5—5 of FIG. 2.

FIG. 6 is a transverse section taken on line 6—6 of FIG. 2.

Referring now more particularly to the drawings, and to the characters of reference marked thereon, the boom, which is of elongated sectional form, is indicated generally at 1; such boom being here shown (see FIG. 1) as embodied in a tractor-mounted tree shaking mechanism. At its inner end, the boom 1 is transversely pivoted, as at 2, on an upstanding part of a frame 3 secured to a tractor 4; there being a forwardly and upwardly inclined, elongated power cylinder 5 pivotally connected at its lower end to a forward part of the frame 3, as at 6, and pivotally connected at its upper end to the boom 1, as at 7. The power cylinder 5 serves the purpose of raising and lowering the boom 1.

The boom 1 is fitted with a shaker unit, indicated generally at 8, which shaker unit is solenoid valve controlled and pneumatically actuated and is provided at its outer end with a reciprocable tree engaging head 9 which in practice is preferably in the form of a yoke. The unit 8 is rotatable about a longitudinal axis at the outer end of the boom, and the present invention is directed to the construction of a means to control such rotation from a point adjacent the seat of the tractor 4 in such a manner as to not interfere with the ready separation of the boom sections of the boom 1, which—in the present embodiment—includes an inner box beam section 10 and an outer box beam section 11 abutting at adjacent ends and detachably connected by a joint, indicated generally at 12.

Each of the boom sections 10 and 11 is comprised of a pair of elongated, initially separate, channel members 13 opening toward each other and disposed in matching engagement; said members being welded together top and bottom by longitudinal, central lines of weld, as at 14.

At their adjacent or abutting edges, the channel members 13 include—in integral relation—inturned right angle flanges 15 which rest in abutment, and which flanges extend inwardly a limited distance. At their inner edges, the flanges 15—of each pair—are formed with integral, longitudinally extending, inwardly divergent wings 16 which form cradles 17. The cradles 17 open towards each other and are spaced apart.

A central pipe section 18 is disposed between and is rigidly supported by the opposed cradles 17; such pipe section extending the full length of the related boom section.

At adjacent ends the boom sections 10 and 11 are connected by the joint 12, and which comprises the following:

Each of the boom sections 10 and 11 is provided with an end plate 19 secured in place as by welding; there being wells 20 in the four sides of each boom section immediately adjacent and opening to the back side of such end plate 19. Each end plate 19 is formed with bolt holes 21 which open into the wells 20; the end plates 19—when the boom is assembled—being secured together, in matching relation, by bolts 22 which extend from the wells 20 of one boom section, through the matching bolt holes 21, and thence into the wells of the other boom section, where such bolts are fitted with retention nuts 23.

A gasket 24 is engaged between the end plates 19 when the same are secured together, as above; the bolts 22 passing through holes 24a in said gasket. The purpose of such gasket will hereinafter appear.

The central pipe section 18 in each of the boom sections 10 and 11 opens through the related end plate 19, as at 25, and is suitably secured in connection therewith; the pipe section terminating flush with the outer face of the end plate. When the end plates 19 are secured together, the central pipe sections 18 in the boom sections 10 and 11 are in register and in communication with each other; the gasket 24 having a central circular opening 26 which matches the openings 25, and is of a diameter corresponding to the bore of the pipe section, as shown in FIG. 4.

It will thus be recognized that when the boom 1 is assembled, air under pressure can be transmitted without leakage through the boom, from its inner end to the pneumatically actuated shaker unit 8 on its outer end, by means of the communicating pipe sections 18.

As the shaker unit 8 is solenoid valve controlled, it is necessary that electric wires run through the boom 1 from end to end thereof, and this is accomplished as follows:

Each of the boom sections 10 and 11 includes therein—and in offset relation to the wells 20—an electric wire enclosing conduit 27 wherein the wires are shown at 28. Each conduit 27 opens through the related end plate 19, as at 29, and is suitably secured in connection therewith; the conduits 27 being matching in communication when said end plates are secured together, and the gasket 24 is provided with a corresponding hole 30. Thus, after the boom 1 is assembled, the electric wires 28 can be run therethrough from end to end in the conduits 27.

As pointed out above, the shaker unit 8 is rotatably mounted about a longitudinal axis at the far outer end of the above described sectional boom, and it is, of course, obvious that as a practical matter its rotation should be controlled by the operator from a point adjacent the seat of the tractor 4. To this end there is provided a longitudinal shaft 31 which extends full length through the boom 1 and out of the rear or lower end thereof, where such shaft is fitted with a hand wheel 32 closely adjacent the seat of the tractor as shown in FIG. 1. The shaft 31 is supported—at spaced points in the length of the boom 1, and in offset relation to the weils 20—by means of rubberlined guide sleeves 33 supported by bracket plates 34.

At the joint 12 the longitudinal shaft 31 passes through matching holes 35 in the end plates 19, and a corresponding hole 36 in the gasket 24.

In order to permit the boom sections 10 and 11 to be detached one from the other at the joint 12, the longitudinal shaft 31 includes—at a point in its length and adjacent said joint—a separable connection 37 which comprises a socket 38 and a non-circular shank 39 slidably engaged in said socket.

The boom 1, constructed as described, provides a very effective support between the tractor 4 and the shaker unit 8 and provides for an adequate and practical control of the rotation of the shaker head 9 through the medium of the shaft 31 projecting therethrough from a point adjacent the seat of the tractor, and which shaft is so constructed that it will in no way interfere with the ready disassembly of the boom sections 10 and 11 at the joint 12 when necessary for transport of the boom from point to point.

From the foregoing description it will be readily seen that there has been produced such a device as will fully fulfill the objects of the invention, as set forth herein.

While this specification sets forth in detail the present and preferred construction of the device, still in practice such deviations therefrom may be resorted to as do not form a departure from the spirit of the invention, as defined by the appended claims.

I claim:

1. In a tree shaker assembly which includes a boom having a rotatable shaker unit mounted on and projecting from its outer end, the boom comprising initially separate longitudinal hollow boom sections disposed end to end, transverse end plates fixed on adjacent ends of the boom sections, detachable bolts securing the end plates together, a longitudinal control shaft within the boom extending the full length thereof and connected at its outer end to the rotatable shaker unit, there being matching holes in the end plates through which said shaft extends, the shaft comprising separate sections, one in each boom section, bearing sleeves for the shaft sections mounted in the boom sections adjacent the adjacent ends thereof, and a disengageable connection unit on the adjacent ends of the shaft sections between the bearing sleeves and arranged for engagement and disengagement upon corresponding relative movements of the boom sections.

2. In a tree shaker assembly which includes a boom having an air actuated shaker unit mounted on and projecting from its outer end, the boom comprising initially separate longitudinal hollow sections disposed end to end, transverse end plates fixed on adjacent ends of the boom sections, means detachably connecting said plates together, a compressed air pipe unit extending along and within the boom from end to end thereof and connected at its outer end to the shaker unit, said pipe unit comprising separate and alined sections terminating at their adjacent ends at and secured to the end plates in air-tight relation, the end plates having matching openings registering with the pipe sections, and a gasket orificed to register with the plate openings secured between the end plates.

3. A structure, as in claim 2, with rigid elements within the boom sections engaging and supporting the pipe sections against bending both in horizontal and vertical directions; the pipe being of relatively small size compared to the interior dimensions of the boom sections.

References Cited in the file of this patent

UNITED STATES PATENTS

| | | |
|---|---|---|
| 2,159,311 | Berger | May 23, 1939 |
| 2,804,743 | Gould et al. | Sept. 3, 1957 |
| 3,013,374 | Balsbaugh | Dec. 19, 1961 |